US012515730B2

(12) United States Patent
Kim (10) Patent No.: US 12,515,730 B2
(45) Date of Patent: Jan. 6, 2026

(54) STEERING CONTROL DEVICE AND METHOD

(71) Applicant: HL MANDO CORPORATION, Gyeonggi-do (KR)

(72) Inventor: Youngbeom Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 144 days.

(21) Appl. No.: 18/241,241

(22) Filed: Sep. 1, 2023

(65) Prior Publication Data

US 2024/0409152 A1 Dec. 12, 2024

(30) Foreign Application Priority Data

Jun. 12, 2023 (KR) .......................... 10-2023-0074796

(51) Int. Cl.
*B62D 5/04* (2006.01)
*H04L 12/40* (2006.01)

(52) U.S. Cl.
CPC ...... *B62D 5/0457* (2013.01); *H04L 12/40032* (2013.01); *H04L 2012/40215* (2013.01); *H04L 2012/40273* (2013.01)

(58) Field of Classification Search
CPC .... B62D 5/0457; B62D 5/003; B62D 5/0484; B62D 5/046; H04L 12/40032; H04L 2012/40215; H04L 2012/40273; H04L 12/40182; B60Y 2306/13
See application file for complete search history.

(56) References Cited

U.S. PATENT DOCUMENTS

| 2019/0009813 | A1* | 1/2019 | Siskoy | B62D 5/0484 |
| 2019/0246294 | A1 | 8/2019 | Kim | |
| 2020/0207406 | A1* | 7/2020 | Endoh | B62D 5/0481 |
| 2020/0314608 | A1* | 10/2020 | Harada | H04W 40/24 |

(Continued)

FOREIGN PATENT DOCUMENTS

| JP | 2010143458 | A | * | 7/2010 |
| KR | 10-2019-0094531 | | | 8/2019 |
| KR | 10-2167906 | | | 10/2020 |

OTHER PUBLICATIONS

Machine Translation of JP2010143458A pdf File Name: "JP2010143458A_Machine_Translation.pdf" (Year: 2010).*

(Continued)

*Primary Examiner* — Lindsay M Low
*Assistant Examiner* — Ruben Picon-Feliciano
(74) *Attorney, Agent, or Firm* — WOMBLE BOND DICKINSON (US) LLP (57) ABSTRACT

The present embodiments relate to a steering control device and method. A steering control device and method according to the present embodiments may determine and use the most suitable communication channel for communication among different communication channels of the communication channel unit according to different states of communication channels in the communication channel unit connected to the plurality of control modules. Therefore, it is possible to improve communication reliability and increase stability by controlling data transmission and reception through another one or two or more communication channels even if a failure occurs in any one communication channel.

20 Claims, 5 Drawing Sheets

(56) References Cited

U.S. PATENT DOCUMENTS

2022/0250675 A1    8/2022  Jeong et al.
2022/0258794 A1*   8/2022  Takesaki .............. B62D 5/0484
2023/0119506 A1*   4/2023  Hasegawa ............ B62D 5/0424
                                                           701/41

OTHER PUBLICATIONS

Office Action dated Apr. 4, 2025 for Korean Patent Application No. 10-2023-0074796 and its English translation provided by Applicant's foreign counsel.

* cited by examiner

STEERING CONTROL DEVICE AND METHOD

CROSS REFERENCE TO RELATED APPLICATION

This application claims priority from Korean Patent Application No. 10-2023-0074796, filed on Jun. 12, 2023, which is hereby incorporated by reference for all purposes as if fully set forth herein.

TECHNICAL FIELD

An embodiment of the present disclosure relates to a steering control device and method capable of selecting and using the most suitable communication channel by determining which communication channel is most suitable for communication among different communication channels of the communication channel unit.

BACKGROUND

An electronic steering device may refer to a device capable of changing a steering angle of a wheel based on a steering force (or rotational force) applied to a steering wheel by a driver.

That is, the steering control device may be a device which assists a steering force so as for a driver to lightly perform steering by using a steering motor.

Recently, there is being actively conducted a research on a redundancy system as a technology related to autonomous driving.

A steering control device having a redundancy function may generally include a plurality of sensors, a plurality of electronic control units (ECUs), and a plurality of steering motors.

In such a redundancy system, if any one ECU among a plurality of ECUs does not receive information, the operation of the corresponding ECU is limited.

In this case, the other ECU may transmit and receive data through the communication channel unit to continuously and auxiliary control the steering motor. However, if the other ECU fails to transmit and receive data for steering motor control, there may occur a serious problem in the stability of the vehicle due to non-execution of steering assist control.

Accordingly, it is important to quickly and accurately determine the state of the communication channel unit and replace the failed communication channel unit.

SUMMARY

A steering control device and method according to the present embodiments may determine and use the most suitable communication channel for communication among different communication channels of the communication channel unit according to different states of communication channels in the communication channel unit connected to the plurality of control modules. Therefore, it is possible to improve communication reliability and increase stability by controlling data transmission and reception through another one or two or more communication channels even if a failure occurs in any one communication channel.

In accordance with an aspect of the present disclosure, there is provided a steering control device including a controller including a first control module and a second control module for controlling a steering motor, and a communication channel unit including a first internal communication channel connecting the first control module and the second control module to each other, a second internal communication channel connecting the first control module and the second control module to each other, and an external communication channel which connects the first control module and the second control module to each other and is connected to a vehicle, wherein the controller may be configured to analyze a state of the communication channel unit based on data transmitted and received through the communication channel unit, determine which communication channel is most suitable for communication among different communication channels, and select and use the most suitable communication channel.

The controller may include an analyzer configured to analyze states of different communication channels of the communication channel unit based on data transmitted and received by the first control module and the second control module through the communication channel unit, a determiner configured to determine which communication channel among different communication channels of the communication channel unit is most suitable for communication as a result of an analysis by the analyzer, and a selector configured to select and use the most suitable communication channel among communication channels according to a result of a determination by the determiner.

The controller according to an embodiment may further comprise an output unit configured to output an operating state for each different communication channel of the communication channel unit analyzed by the analyzer.

The controller according to an embodiment may be configured to detect whether data is transmitted and received through the first internal communication channel, the second internal communication channel, and the external communication channel for a predetermined period based on the data transmitted and received through the communication channel unit, determine that the first internal communication channel has failed if data transmission/reception through the first internal communication channel is not detected, and select and use the second internal communication channel or the external communication channel as a communication channel.

The controller according to an embodiment may be configured to detect whether data is transmitted and received through the first internal communication channel, the second internal communication channel, and the external communication channel for a predetermined period based on the data transmitted and received through the communication channel unit, determine that the second internal communication channel has failed if data transmission/reception through the second internal communication channel is not detected, and select and use the first internal communication channel or the external communication channel as a communication channel.

The controller according to an embodiment may be configured to detect whether data is transmitted and received through the first internal communication channel, the second internal communication channel, and the external communication channel for a predetermined period based on the data transmitted and received through the communication channel unit, determine that the external communication channel has failed if data transmission/reception through the external communication channel is not detected, and select and use the first internal communication channel or the second internal communication channel as a communication channel.

The controller according to an embodiment may be configured to detect whether data is transmitted and received through the first internal communication channel, the second internal communication channel, and the external communication channel for a predetermined period based on the data transmitted and received through the communication channel unit, determine that the first internal communication channel and the second internal communication channel have failed if data transmission/reception through the first internal communication channel and the second internal communication channel are not detected, and select and use the external communication channel as a communication channel.

The controller according to an embodiment may be configured to detect whether data is transmitted and received through the first internal communication channel, the second internal communication channel, and the external communication channel for a predetermined period based on the data transmitted and received through the communication channel unit, determine that the first internal communication channel and the external communication channel have failed if data transmission/reception through the first internal communication channel and the external communication channel are not detected, and select and use the second internal communication channel as a communication channel.

The controller according to an embodiment may be configured to detect whether data is transmitted and received through the first internal communication channel, the second internal communication channel, and the external communication channel for a predetermined period based on the data transmitted and received through the communication channel unit, determine that the second internal communication channel and the external communication channel have failed if data transmission/reception through the second internal communication channel and the external communication channel are not detected, and select and use the first internal communication channel as a communication channel.

The controller according embodiment may be configured to detect whether data is transmitted and received through the first internal communication channel, the second internal communication channel, and the external communication channel for a predetermined period based on the data transmitted and received through the communication channel unit, determine that the first internal communication channel, the second internal communication channel and the external communication channel have failed if data transmission/reception through the first internal communication channel, the second internal communication channel and the external communication channel are not detected, and output operating states for the first internal communication channel, the second internal communication channel, and the external communication channel as abnormal states.

The controller according to an embodiment may be configured to compare data transmitted and received through the first internal communication channel for a predetermined period based on data transmitted and received through the communication channel unit with data transmitted and received through the second internal communication channel or the external communication channel, determine that the first internal communication channel has failed if data transmitted and received through the first internal communication channel is different from data transmitted and received through the second internal communication channel or the external communication channel, and select and use the second internal communication channel and the external communication channel as a communication channel.

The controller according to an embodiment may be configured to compare data transmitted and received through the second internal communication channel for a predetermined period based on data transmitted and received through the communication channel unit with data transmitted and received through the first internal communication channel or the external communication channel, determine that the second internal communication channel has failed if data transmitted and received through the second internal communication channel is different from data transmitted and received through the first internal communication channel or the external communication channel, and select and use first internal communication channel and the external communication channel as a communication channel.

The controller according to an embodiment may be configured to compare data transmitted and received through the external communication channel for a predetermined period based on data transmitted and received through the communication channel unit with data transmitted and received through the first internal communication channel or the second internal communication channel, determine that the external communication channel has failed if data transmitted and received through the external communication channel is different from data transmitted and received through the first internal communication channel or the second internal communication channel, and select and use the first internal communication channel and the second internal communication channel as a communication channel.

The controller according to an embodiment may be configured to compare data transmitted and received through the first internal communication channel, the second internal communication channel, and the external communication channel for a predetermined period of time with each other based on the data transmitted and received through the communication channel unit, determine that the first internal communication channel, the second communication channel and the external communication channel have failed if the data transmitted and received through the first internal communication channel, the second internal communication channel, and the external communication channel are different from each other, and output operating states of the first internal communication channel, the second internal communication channel, and the external communication channel as abnormal states.

The communication channel unit according to an embodiment may further include a third internal communication channel connecting the first control module and a third control module to each other. In this case, the controller may be configured to detect whether data is transmitted and received through the first internal communication channel, the second internal communication channel, the third internal communication channel, and the external communication channel during a predetermined period based on the data transmitted and received through the communication channel unit, determine that the third internal communication channel has failed if data transmission/reception through the third internal communication channel is not detected, and select and use the external communication channel as a communication channel.

In addition, the communication channel unit according to an embodiment may further include a fourth internal communication channel connecting the second control module and a fourth control module to each other In this case, the controller may be configured to detect whether data is transmitted and received through the first internal communication channel, the second internal communication channel, the fourth internal communication channel, and the external communication channel during a predetermined period based on the data transmitted and received through the communication channel unit, determine that the fourth internal communication channel has failed if data transmission/reception through the fourth internal communication channel is not detected, and select and use the external communication channel as a communication channel.

In accordance with an aspect of the present disclosure, there is provided a steering control method including: analyzing, by an analyzer, states of different communication channels of a communication channel unit based on data transmitted and received through the communication channel unit; determining, by a determiner, which communication channel among the different communication channels of the communication channel unit is most suitable for communication as a result of the analysis by the analyzer; selecting and using, by a selector, the most suitable communication channel among the different communication channels according to the determination result by the determiner; and outputting, by an output unit, an operating state for each of the different communication channels of the communication channel unit analyzed by the analyzer.

The analyzing may include detecting, if a state of the communication channel unit is abnormal, whether data is transmitted and received through a first internal communication channel, a second internal communication channel, and an external communication channel during a predetermined period based on data transmitted and received through the communication channel unit. The determining may include determining that the first internal communication channel has failed if data transmission/reception through the first internal communication channel is not detected, and the selecting may include selecting and using the second internal communication channel or the external communication channel as a communication channel.

In addition, the analyzing may include detecting, if a state of the communication channel unit is abnormal, whether data is transmitted and received through a first internal communication channel, a second internal communication channel, and an external communication channel during a predetermined period based on data transmitted and received through the communication channel unit. In addition, the determining may include determining that the second internal communication channel has failed if data transmission/reception through the second internal communication channel is not detected, and the selecting may include selecting and using the first internal communication channel or the external communication channel as a communication channel.

In addition, the analyzing may include detecting, if a state of the communication channel unit is abnormal, whether data is transmitted and received through a first internal communication channel, a second internal communication channel, and an external communication channel during a predetermined period based on data transmitted and received through the communication channel unit. In addition, the determining may include determining that the external communication channel has failed if data transmission/reception through the external communication channel is not detected, and the selecting may include selecting and using the first internal communication channel or the second internal communication channel as a communication channel.

According to the present embodiments, there may provide a steering control device and method capable of determining and using the most suitable communication channel for communication among different communication channels of the communication channel unit according to different states of communication channels in the communication channel unit connected to the plurality of control modules. Therefore, it is possible to improve communication reliability and increase stability by controlling data transmission and reception through another one or two or more communication channels even if a failure occurs in any one communication channel.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
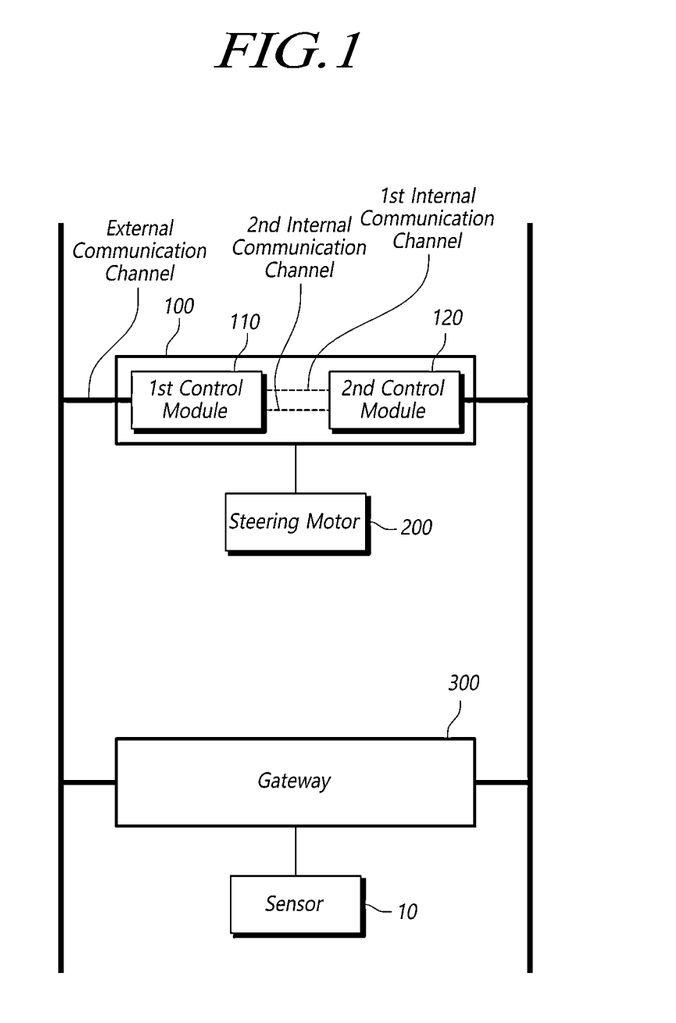
FIG. 1 is a configuration diagram illustrating a steering control device according to an embodiment.
Figure 2:
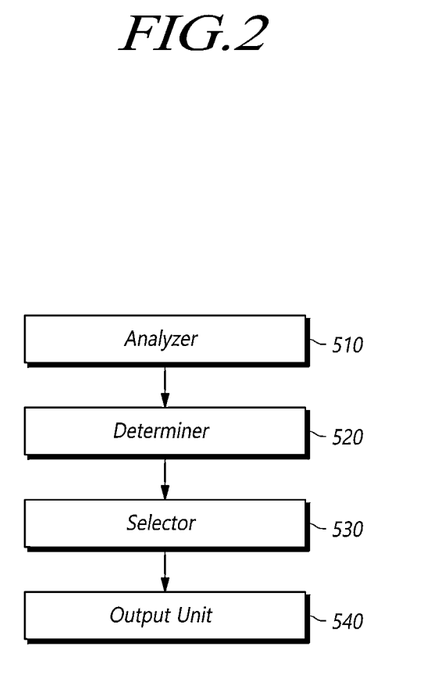
FIG. 2 illustrates a block diagram of a controller of a steering control device according to an embodiment.
Figure 3:
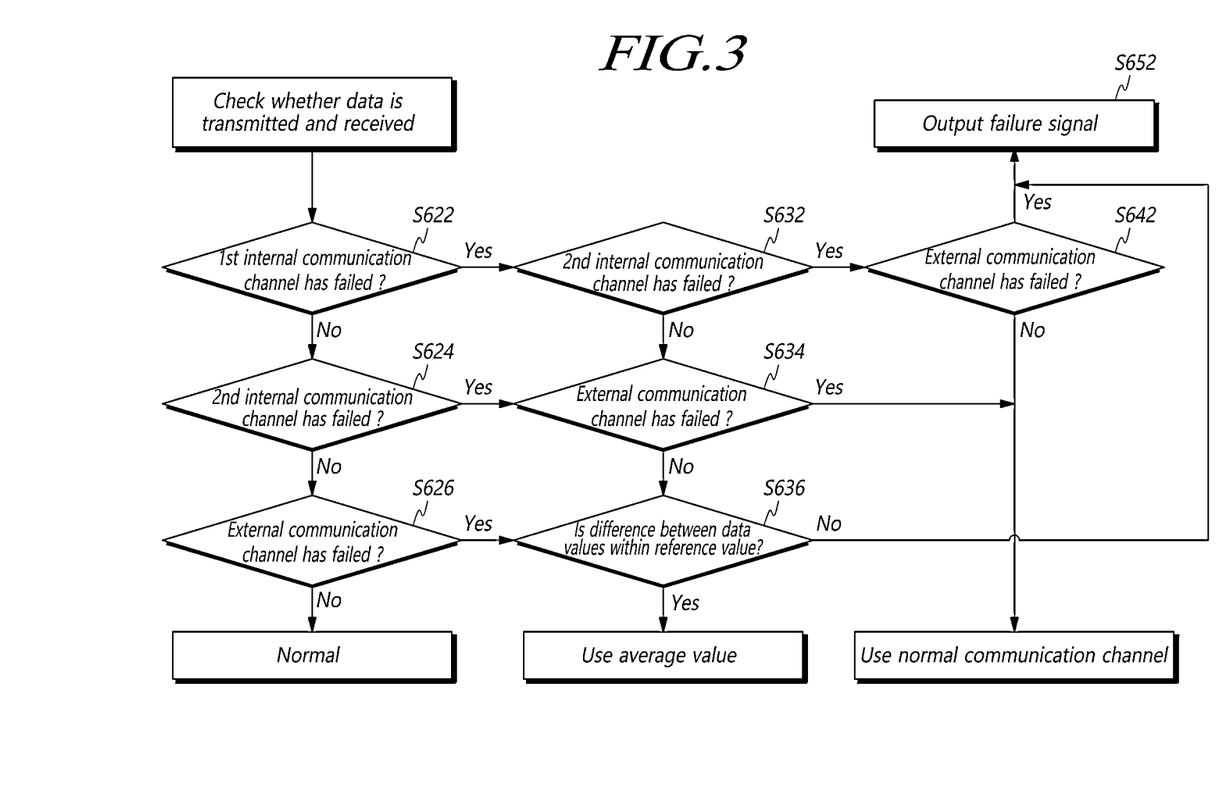
FIG. 3 is a flowchart illustrating a steering control method according to an embodiment.
Figure 4:
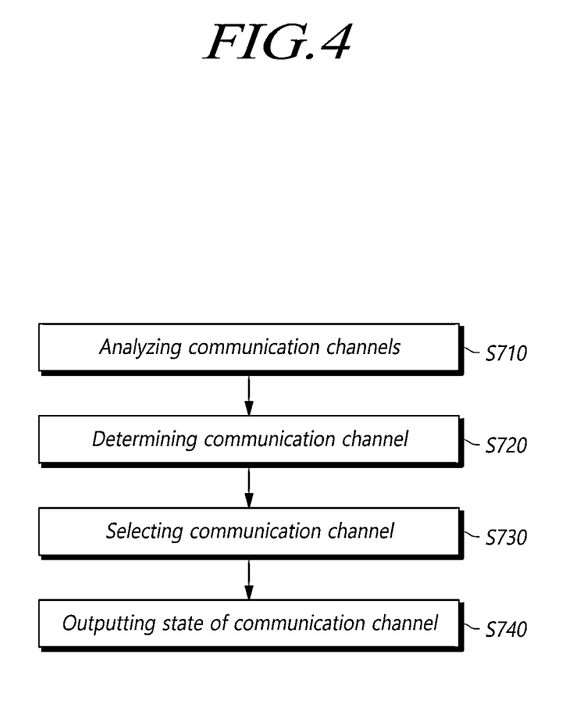
FIG. 4 is a flowchart illustrating a steering control method according to an embodiment.
Figure 5:
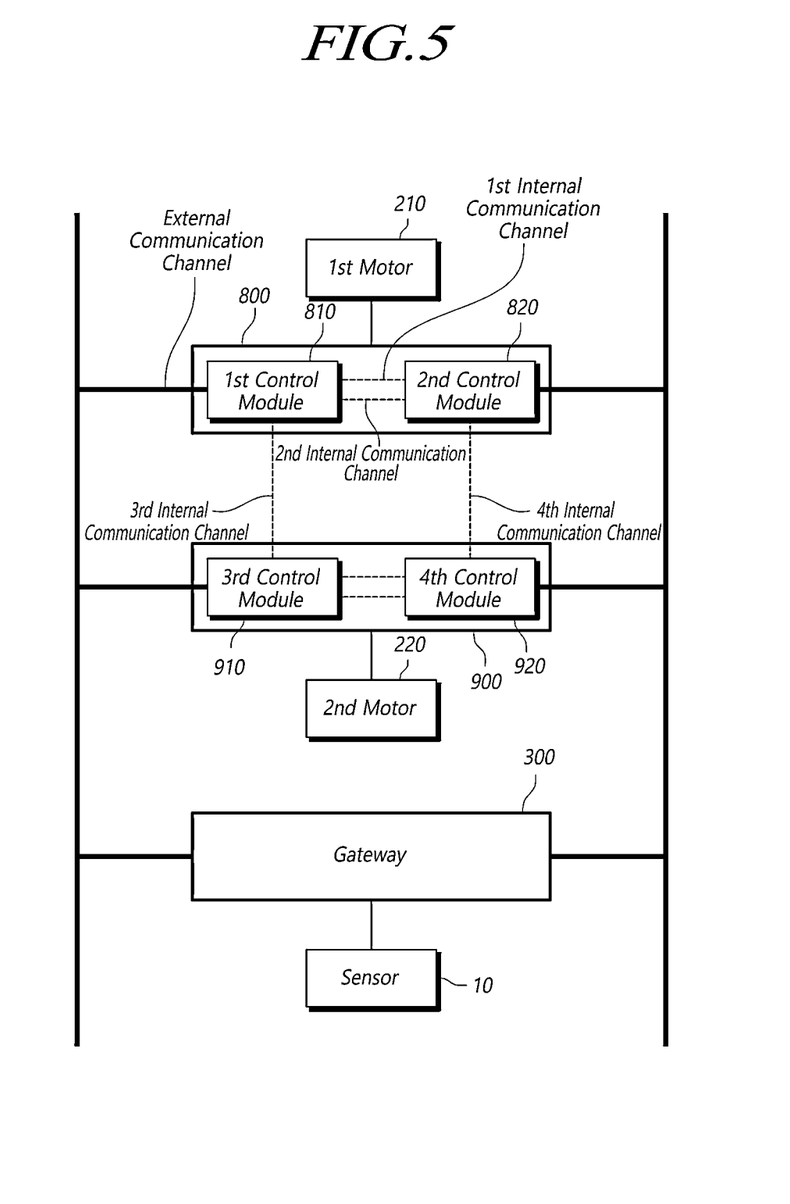
FIG. 5 is a configuration diagram illustrating a steering control device according to another embodiment.

FIG. 1 is a configuration diagram illustrating a steering control device according to an embodiment, FIG. 2 illustrates a block diagram of a controller of a steering control device according to an embodiment, FIG. 3 is a flowchart illustrating a steering control method according to an embodiment, FIG. 4 is a flowchart illustrating a steering control method according to an embodiment, and FIG. 5 is a configuration diagram illustrating a steering control device according to another embodiment.

A steering control device of a vehicle may include an electronic power steering (EPS) which uses an electric motor to assist an operating force of a steering wheel, and a steer-by-wire (SBW) type steering device in which an upper device including a steering wheel and a reaction force motor and a lower device including a rack and a steering motor are mechanically separated.

This embodiment may be applied to an electric motor in a column-type electric power steering (C-EPS) device, a rack-type electric power steering (R-EPS) device, or a steer-by-wire type steering devices.

Hereinafter, the structure of the column-type electric power steering device will be described in this embodiment as an example, but is not limited thereto, and can be applied to all types of steering control devices.

FIG. 1 is a configuration diagram illustrating a steering control device according to an embodiment.

A steering control device according an embodiment may include a controller 100 including a first control module 110 and a second control) module 120 for controlling a steering motor 200, and a communication channel unit including a first internal communication channel connecting the first control module 110 and the second control module 120 to each other, a second internal communication channel connecting the first control module 110 and the second to each control module 120 other, and an external communication channel which connects the first control module 110 and the second control module 120 to each other and is connected to a vehicle. The controller 100 may analyze a state of the communication channel unit based on data transmitted and received through the communication channel unit, determine which communication channel is most suitable for communication among different communication channels, and select and use the most suitable communication channel.

The steering control device may assist the operation force of the steering wheel so that the driving direction of the vehicle can be easily changed with a smaller force. To this end, the controller 100 may calculate a target rack position for providing steering assist force based on steering information from a steering angle sensor, a torque sensor, and a speed sensor, and may output a target current corresponding to the target rack position to the steering motor 200.

Here, as a steering shaft of a steering column may be rotated by the rotation of the steering motor 200, the rack bar may move left and right through a pinion gear connected to the output end of the steering shaft and a rack gear.

Accordingly, the steering control device moves the wheels connected to both ends of the rack bar to the left or right by the rotation of the steering motor 200 for assisting the operation force of the steering wheel, so that the vehicle can smoothly move in a desired direction.

The steering motor 200 included in the steering control device may be a dual winding steering motor including a first winding motor and a second winding motor therein, but is not limited thereto.

The controller 100 may be implemented as hardwares such as an electronic control unit (ECU) including a micro controller unit (MCU), an inverter, and a printed circuit board (PCB), and software.

The controller 100 may perform a function of receiving power from a power supply unit, generating and supplying a target current to each winding of the steering motor 200 using an inverter.

As shown in FIG. 1, the controller 100 may include a first control module 110 and a second control module 120 *t* for controlling the steering motor 200.

Specifically, the steering control device may include a first control module 110 and a second control module 120 that periodically share data through a communication channel unit, and may determine whether or not there is a failure of each communication channel of the communication channel unit based on data transmitted and received between the first control module 110 and the second control module 120.

The first control module 110 and the second control module 120 may be a device for controlling electronic modules (e.g., for engine, automatic transmission, ABS, etc.) mounted to drive the vehicle, and may be an electronic control unit (ECU) for a vehicle which receives electrical signals detected by various input sensors of the vehicle and outputs digital control signals for driving various actuators on the output side.

The first control module 110 may transmit and receive data to and from the second control module 120 through a first internal communication channel, a second internal communication channel, and an external communication channel of the communication channel unit.

In addition, the second control module 120 may transmit and receive data with the first control module 110 through the first internal communication channel, the second internal communication channel, and the external communication channel of the communication channel unit.

The communication channel unit may include a first internal communication channel connecting the first control module 110 and the second control module 120 to each other, a second internal communication channel connecting the first control module 110 and the second control module 120 to each other, and an external communication channel connecting the first control module 110 and the second control module 120 to each other and connected to the vehicle.

The first internal communication channel and the second internal communication channel may be private communication lines through which only the first control module 110 and the second control module 120 can transmit and receive data without being connected to an external node.

Here, the external node may be a packet switch or network access point connected for communication with a module outside the EPS.

The external communication channel may be a public (vehicle) communication line.

As an example, the external communication channel may be a controller area network (CAN) communication channel designed to allow microcontrollers or devices to communicate with each other in a vehicle without a host computer.

In addition, the external communication channel may include a gateway 300 which is connected to an external node to receive sensing information from the plurality of sensors 10 and transmit and receive data between the first control module 110 and the second control module 120.

Specifically, the external communication channel may be connected to an external node so that the first control module 110 and the second control module 120 can receive a plurality of sensing information detected by each of a plurality of sensors 10 mounted on the vehicle.

In addition, the external communication channel may include a gateway 300 connected to a network and performing network communication so as for the first control module 110 and the second control module 120 to transmit and receive data form and to each other.

Sensing information is not limited to information that can be received by being limited to an external node. The first control module 110 and the second control module 120 may each receive sensing information sensed from the plurality of sensors 10 through the gateway 300 as well as an external node.

The controller 100 may analyze a state of the communication channel unit based on data transmitted and received through the communication channel unit, may determine which communication channel among different communication channels of the communication channel unit is most suitable to perform the communication, and may select and use the most suitable communication channel.

Here, the first control module 110 and the second control module 120 of the controller 100 may transmit and receive state information on different communication channels of the communication channel unit based on data transmitted and received through the communication channel unit.

Specifically, the first control module 110 may periodically transmit state information for each different communication channel of the communication channel unit to the second control module 120, and the second control module 120 may periodically transmit state information on the communication channels of the communication channel unit to the first control module 110.

For example, the state information may include information on whether data is transmitted and received through different communication channels of the communication channel unit, and information obtained by comparing data periodically transmitted and received between the first control module 110 and the second control module.

Accordingly, if data is not transmitted or received from any one or more communication channels based on the state information or data transmitted or received from different communication channels are different from each other, the controller 100 may determine the communication channel unit as an abnormal state and views the communication channel unit as an abnormal state, and select and use the most suitable communication channel among different communication channels as the communication channel.

FIG. 2 illustrates a block diagram of a controller of a steering control device according to an embodiment.

Referring to FIG. 2, the controller 100 may include an analyzer 510 which analyzes states of different communication channels of the communication channel unit based on data transmitted and received by the first control module and the second module through the control communication channel unit, a determiner 520 configured to determine which communication channel among different communication channels of the communication channel unit is most suitable for communication as a result of an analysis by the analyzer 510, a selector 530 configured to select and use the most suitable communication channel among communication channels according to a result of a determination by the determiner 520, and an output unit 540 which outputs operating states for different communication channels of the communication channel unit analyzed by the analyzer 510.

In this case, the first control module 110 or the second control module 120 may include the analyzer 510, the determiner 520, the selector 530, and the output unit 540.

The analyzer 510 may analyze the state of each of the different communication channels of the communication channel unit based on data transmitted and received between the first control module 110 and the second control module 120 through the communication channel unit.

Specifically, the first control module 110 may periodically transmit the state information for each different communication channel of the communication channel unit to the second control module 120, and the second control module 120 may periodically transmit state information on the communication channels of the communication channel unit to the first control module 110. In addition, the first control module 110 and the second control module 120 may analyze state information about different communication channels of the communication channel unit based on data transmitted and received through the communication channel unit.

Accordingly, the analyzer 510 may analyze the operating state of each communication channel of the communication channel unit.

The determiner 520 may determine which communication channel among different communication channels of the communication channel unit is most suitable for communication as a result of the analysis by the analyzer 510.

That is, if it is determined that data is not transmitted and received from any one or more communication channels based on the state information, the determiner 520 may determine the communication channel through which data is not transmitted/received as a failure.

In addition, the determiner 520 may determine that the communication channel unit is in an abnormal state if data transmitted and received from communication channels are different from each other.

For example, if data transmitted and received from the external communication channel and the first internal communication channel are the same, and data transmitted and received through the second internal communication channel is different from data transmitted and received through the external communication channel or the first internal communication channel, the determiner 520 may determine the second internal communication channel to be in an abnormal state.

The selector 530 may select and use the most suitable communication channel among the communication channels according to the determination result of the determiner 520 as the communication channel.

That is, if data is not transmitted or received through one communication channel or one communication channel has a failure, the selector 530 may select one or more communication channels to transmit and receive data.

In addition, if data transmitted and received from different communication channels are different from each other, the selector 530 may compare the difference between data values and received from two transmitted the communication channels with a preset reference value. If the difference between the data values is included in the reference value range, the selector 530 may select to use the average value of data values transmitted and received through the two communication channels.

In this case, if the difference between the data values is not included in the reference value range, the selector 530 may compare the difference between the data values transmitted and received from the other two communication channels with a preset reference value. If the difference between the data values falls within the reference value range, the selector 530 may select to use an average value of data values transmitted and received through two communication channels.

In addition, if the difference between the data values is not included in the reference value range in all cases, the selector 530 may determine the operating state of the communication channel unit as an abnormal state, and may not select a communication channel.

The output unit 540 may output operating states for each different communication channel of the communication channel unit analyzed by the analyzer 510.

The operating state of the communication channel unit for each different communication channel may be transmitted to an autonomous driving module, and the autonomous driving module may control the vehicle according to the operating state of the communication channel unit output from the output unit 540.

That is, according to the present embodiment, the autonomous driving module may control the vehicle to drive normally or to stop the vehicle by performing lane change control of the vehicle on the shoulder according to the operating state of the communication channel unit output from the output unit 540.

In this case, the output unit 540 may output the operating state for different communication channels of the communication channel unit through a display unit including a liquid crystal display (LCD), a head-up display (HUD), and the like.

The output unit 540 may include an audio output module such as a speaker capable of outputting audio data.

FIG. 3 is a flowchart illustrating a steering control method according to an embodiment.

As an example, referring to FIG. 3, the controller 100 may detect whether data is transmitted and received through the first internal communication channel, the second internal communication channel, and the external communication channel for a predetermined period based on the data transmitted and received through the communication channel unit, may determine that the first internal communication channel has failed if data transmission/reception through the first internal communication channel is not detected, and may select and use the second internal communication channel or the external communication channel as a communication channel (S622, S632, S634).

That is, the steering control device may determine whether data is transmitted and received through the first internal communication channel, the second internal communication channel, and the external communication channel for a predetermined period based on the data transmitted and received by the analyzer 510 through the communication channel unit.

In the steering control device, if the analyzer 510 detects that data has not been transmitted and received through the first internal communication channel, the determiner 520 determine may that the first internal communication channel has failed, and the selector 530 may select and use the second internal communication channel or the external communication channel as the communication channel.

In this case, the output unit 540 may output a failure signal for the first internal communication channel.

In addition, the controller 100 may detect whether data is transmitted and received through the first internal communication channel, the second internal communication channel, and the external communication channel for a predetermined period based on the data transmitted and received through the communication channel unit, may determine that the second internal communication channel has failed if data transmission/reception through the second internal communication channel is not detected, and may select and use the first internal communication channel or the external communication channel as a communication channel (S622, S624, S634).

That is, the steering control device may determine whether data is transmitted and received through the first internal communication channel, the second internal communication channel, and the external communication channel for a predetermined period based on the data transmitted and received by the analyzer 510 through the communication channel unit.

In the steering control device, if the analyzer 510 detects that data has not been transmitted and received through the second internal communication channel, the determiner 520 may determine that the second internal communication channel has failed, and the selector 530 may select and use the first internal communication channel or the external communication channel as the communication channel.

In this case, the output unit 540 may output a failure signal for the second internal communication channel.

In addition, the controller 100 may detect whether data is transmitted and received through the first internal communication channel, the second internal communication channel, and the external communication channel for a predetermined period based on the data transmitted and received through the communication channel unit, may determine that the external communication channel has failed if data transmission/reception through the second internal communication channel is not detected, and may select and use the first internal communication channel or the second internal communication channel as a communication channel (S622, S624, S626).

That is, the steering control device may determine whether data is transmitted and received through the first internal communication channel, the second internal communication channel, and the external communication channel for a predetermined period based on the data transmitted and received by the analyzer 510 through the communication channel unit.

In the steering control device, if the analyzer 510 detects that data has not been transmitted and received through the external communication channel, the determiner 520 may determine that the external communication channel has failed, and the selector 530 may select and use the first internal communication channel or the second internal communication channel as the communication channel.

In this case, the output unit 540 may output a failure signal for the external communication channel.

In addition, the controller 100 may detect whether data is transmitted and received through the first internal communication channel, the second internal communication channel, and the external communication channel for a predetermined period based on the data transmitted and received through the communication channel unit, may determine that the first internal communication channel and the second internal communication channel have failed if data transmission/reception through the first internal communication channel and the second internal communication channel are not detected, and may select and use the external communication channel as a communication channel (S622, S632, S642).

That is, the steering control device may determine whether data is transmitted and received through the first internal communication channel, the second internal communication channel, and the external communication channel for a predetermined period based on the data transmitted and received by the analyzer 510 through the communication channel unit.

In the steering control device, if the analyzer 510 detects that data has not been transmitted and received through the first internal communication channel and the second internal communication channel, the determiner 520 may determine that the first internal communication channel and the second internal communication channel have failed, and the selector 530 select may and use the external communication channel as the communication channel.

In this case, the output unit 540 may output a failure signal for the first internal communication channel and the second internal communication channel.

In addition, the controller 100 may detect whether data is transmitted and received through the first internal communication channel, the second internal communication channel, and the external communication channel for a predetermined period based on the data transmitted and received through the communication channel unit, may determine that the first internal communication channel and the external communication channel have failed if data transmission/reception through the first internal communication channel and the external communication channel are not detected, and may select and use the external communication channel as a communication channel (S622, S632, S634).

That is, the steering control device may determine whether data is transmitted and received through the first internal communication channel, the second internal communication channel, and the external communication channel for a predetermined period based on the data transmitted and received by the analyzer 510 through the communication channel unit.

In the steering control device, if the analyzer 510 detects that data has not been transmitted and received through the first internal communication channel and the external communication channel, the determiner 520 may determine that the external communication channel and the first internal communication channel have failed, and the selector 530 may select and use the second internal communication channel as the communication channel.

In this case, the output unit 540 may output a failure signal for the first internal communication channel and the external communication channel.

In addition, the controller 100 may detect whether data is transmitted and received through the first internal communication channel, the second internal communication channel, and the external communication channel for a predetermined period based on the data transmitted and received through the communication channel unit, may determine that the second internal communication channel and the external communication channel have failed if data transmission/reception through the second internal communication channel and the external communication channel is not detected, and may select and use the first internal communication channel as a communication channel (S622, S624, S634).

That is, in the steering control device, the analyzer 510 may detect whether data is transmitted and received through the first internal communication channel, the second internal communication channel, and the external communication channel for a predetermined period based on the data transmitted and received through the communication channel unit.

In the steering control device, if the analyzer 510 detects that data has not been transmitted and received through the second internal communication channel and the external communication channel, the determiner 520 may determine that the external communication channel and the second internal communication channel have failed, and the selector 530 the first internal may select and use communication channel as the communication channel.

In this case, the output unit 540 may output a failure signal for the second internal communication channel and the external communication channel.

In addition, the controller 100 may detect whether data is transmitted and received through the first internal communication channel, the second internal communication channel, and the external communication channel for a predetermined period based on the data transmitted and received through the communication channel unit, may determine that the first internal communication channel, the second internal communication channel and the external communication channel have failed if data transmission/reception through the first internal communication channel, the second internal communication channel and the external communication channel are not detected, and may output operating states for the first internal communication channel, the second internal communication channel, and the external communication channel as abnormal states (S652).

That is, in the steering control device, the analyzer 510 may detect whether data is transmitted and received through the first internal communication channel, the second internal communication channel, and the external communication channel for a predetermined period based on the data transmitted and received through the communication channel unit.

In the steering control device, if the analyzer 510 detects that data has not been transmitted and received through the first communication channel, the second internal communication channel and the external communication channel, the determiner 520 may determine that the first internal communication channel, the second internal communication channel and the external communication channel have failed. In this case, the selector 530 may determine that the operating state of the communication channel unit as an abnormal state, and may not select a communication channel.

In this case, the output unit 540 may output a failure signal for the first communication channel, the second internal communication channel and the external communication channel.

In addition, the controller 100 may compare data transmitted and received through the first internal communication channel for a predetermined period based on data transmitted and received through the communication channel unit with data transmitted and received through the second internal communication channel or the external communication channel, may determine that the first internal communication channel has failed if data transmitted and received through the first internal communication channel is different from data transmitted and received through the second internal communication channel or the external communication channel, and may select and use the second internal communication channel and the external communication channel as a communication channel (S622, S632, S634, S636).

That is, the analyzer 510 of the steering control device may analyze the data by comparing data transmitted and received through the first internal communication channel for a predetermined period based on data transmitted and received through the communication channel unit with data transmitted and received through the second internal communication channel or the external communication channel.

In addition, in the steering control device, if the analyzer 510 analyzes that data transmitted and received through the first internal communication channel is different from data transmitted and received through the second internal communication channel or external communication channel, the determiner 520 may determine that the first internal communication channel has failed, and the selector 530 may select and use the second internal communication channel and the external communication channel as communication channels.

In this case, if data transmitted and received from the first internal communication channel and the second internal communication channel or the first internal communication channel and the external communication channel are different from each other, the controller 100 may compare the difference between the data values transmitted and received from the second internal communication channel and the external communication channel with a preset reference value. If the difference between the data values is included in the reference value range, the controller 100 may use an average value of data values transmitted and received through two communication channels.

On the other hand, if the difference between the data values is not included in the reference value range, the controller 100 may determine the operating state of the communication channel unit as an abnormal state, and may not select a communication channel.

In addition, the controller 100 may compare data transmitted and received through the second internal communication channel for a predetermined period based on data transmitted and received through the communication channel unit with data transmitted and received through the first internal communication channel or the external communication channel, may determine that the second internal communication channel has failed if data transmitted and received through the second internal communication channel is different from data transmitted and received through the first internal communication channel or the external communication channel, and may select and use first second internal communication channel and the external communication channel as a communication channel (S622, S624, S634, S636).

That is, the analyzer 510 of the steering control device may analyze the data by comparing data transmitted and received through the second internal communication channel for a predetermined period based on data transmitted and received through the communication channel unit with data transmitted and received through the first internal communication channel or the external communication channel.

In addition, in the steering control device, if the analyzer 510 analyzes that data transmitted and received through the second internal communication channel is different from data transmitted and received through the first internal communication channel or external communication channel, the determiner 520 may determine that the second internal communication channel has failed, and the selector 530 may select and use the first internal communication channel and the external communication channel as communication channels.

In this case, if data transmitted and received from the first internal communication channel and the second internal communication channel or the second internal communication channel and the external communication channel are different from each other, the controller 100 may compare the difference between the data values transmitted and received from the first internal communication channel and the external communication channel with a preset reference value. If the difference between the data values is included in the reference value range, the controller 100 may use an average value of data values transmitted and received through two communication channels.

On the other hand, if the difference between the data values is not included in the reference value range, the controller 100 may determine the operating state of the communication channel unit as an abnormal state, and may not select a communication channel.

In addition, the controller 100 may compare data transmitted and received through the external communication channel for a predetermined period based on data transmitted and received through the communication channel unit with data transmitted and received through the first internal communication channel or the second internal communication channel, may determine that the external communication channel has failed if data transmitted and received through the external communication channel is different from data transmitted and received through the first internal communication channel or the second internal communication channel, and may select and use the first internal communication channel and the second internal communication channel as a communication channel (S622, S624, S626, S636).

That is, the analyzer 510 of the steering control device may analyze the data by comparing data transmitted and received through the external communication channel for a predetermined period based on data transmitted and received through the communication channel unit with data transmitted and received through the first internal communication channel or the second communication channel.

In addition, in the steering control device, if the analyzer 510 analyzes that data transmitted and received through the external communication channel is different from data transmitted and received through the first internal communication channel or the second communication channel, the determiner 520 may determine that the external communication channel has failed, and the selector 530 may select and use the first internal communication channel and the second communication channel as communication channels.

In this case, if data transmitted and received from the first internal communication channel and the external communication channel or the second internal communication channel and the external communication channel are different from each other, the controller 100 may compare the difference between the data values transmitted and received from the first internal communication channel and the second communication channel with a preset reference value. If the difference between the data values is included in the reference value range, the controller 100 may use an average value of data values transmitted and received through two communication channels.

On the other hand, if the difference between the data values is not included in the reference value range, the controller 100 may determine the operating state of the communication channel unit as an abnormal state, and may not select a communication channel.

In addition, the controller 100 may compare data transmitted and received through the first internal communication channel, the second internal communication channel, and the external communication channel for a predetermined period of time with each other based on the data transmitted and received through the communication channel unit, may determine that the first internal communication channel, the second communication channel and the external communication channel have failed if the data transmitted and received through the first internal communication channel, the second internal communication channel, and the external communication channel are different from each other, and may output operating states of the first internal communication channel, the second internal communication channel, and the external communication channel as abnormal states (S652).

That is, the analyzer 510 of the steering control device may analyze the data by comparing data transmitted and received through the first internal communication channel, the second internal communication channel, and the external communication channel for a predetermined period of time with each other based on the data transmitted and received through the communication channel unit.

In addition, in the steering control device, if the analyzer 510 analyzes that the data transmitted and received through the first internal communication channel, the second internal communication channel, and the external communication channel are different from each other, the determiner 520 may determine that the first internal communication channel, the second communication channel and the external communication channel have failed. In this case, the selector 530 may determine the operating state of the communication channel unit as an abnormal state, and may not select a communication channel.

In this case, the output unit 540 may output operating states of the first internal communication channel, the second internal communication channel, and the external communication channel as an abnormal state.

FIG. 5 is a configuration diagram illustrating a steering control device according to another embodiment.

In another embodiment, referring to FIG. 5, the steering control device may include a controller for a steering wheel feedback actuator (SFA) and a controller for a road wheel actuator (RWA), and a sensor 10.

For convenience of description, the steering wheel feedback actuator is expressed as SFA, and the road wheel actuator is expressed as RWA.

A SFA controller 800 may control a first motor 210 (i.e., a reaction force motor) included in the SFA to rotate in order to generate a steering reaction force in an opposite direction according to the rotation angle of the steering wheel.

A RWA controller 900 may control a rack bar to be moved by rotating a second motor 220 (i.e., a pinion shaft motor) based on a position value corresponding to the rotation angle of the steering wheel.

The SFA controller 800 may include a first control module 810 and a second control module 820 that periodically share data through a communication channel unit, and may determine whether or not each communication channel of the communication channel unit has a failure based on data exchanged between the first control module 810 and the second control module 820.

The RWA controller 900 may include a third control module 910 and a fourth control module 920 that periodically share data through a communication channel unit, and may determine whether or not each communication channel of the communication channel unit has a failure based on data exchanged between the third control module 910 and the fourth control module 920.

The communication channel unit may include a first internal communication channel connecting the first control module 810 and the second control module 820 to each other, a second internal communication channel connecting the first control module 810 and the second control module 820 to each other, a third internal communication channel connecting the first control module 810 and the third control module 910 to each other, a channel fourth internal communication connecting the second control module 820 and the fourth control module 920 to each other, and an external communication channel that connects the first control module 810, the second control module 820, the third control module 910, and the fourth control module 920 to each other and is connected to the vehicle.

The controller 100 may detect whether data is received through the first internal transmitted and communication channel, the second internal communication channel, the third internal communication channel, and the external communication channel during a predetermined period based on the data transmitted and received through the communication channel unit, may determine that the third internal communication channel has failed if data transmission/reception through the third internal communication channel is not detected, and may select and use the external communication channel as a communication channel.

In addition, the controller 100 may detect whether data is transmitted and received through the first internal communication channel, the second internal communication channel, the fourth internal communication channel, and the external communication channel during a predetermined period based on the data transmitted and received through the communication channel unit, may determine that the fourth internal communication channel has failed if data transmission/reception through the fourth internal communication channel is not detected, and may select and use the external communication channel as a communication channel.

More specifically, the SFA controller 800 may detect whether data is transmitted and received through the first internal communication channel, the second internal communication channel, the third internal communication channel, the fourth communication channel, and the external communication channel during a predetermined period based on the data transmitted and received through the communication channel unit, may determine that the third internal communication channel has failed if the first control module 810 fails to transmit/receive data with the third control module 910 through the third internal communication channel. In this case, the SFA controller 800 may select and use the external communication channel as the communication channel, or select and use the first internal communication channel and the fourth internal communication channel, or the second internal communication channel and the fourth internal communication channel as the communication channels.

Alternatively, the SFA controller 800 may detect whether data is transmitted and received through the first internal communication channel, the second internal communication channel, the third internal communication channel, the fourth communication channel, and the external communication channel during a predetermined period based on the data transmitted and received through the communication channel unit, may determine that the fourth internal communication channel has failed if the second control module 820 fails to transmit/receive data with the fourth control module 920 through the fourth internal communication channel. In this case, the SFA controller 800 may select and use the external communication channel as the communication channel, or select and use the first internal communication channel and the third internal communication channel, or the second internal communication channel and the third internal communication channel as the communication channels.

FIG. 4 is a flowchart illustrating a steering control method according to an embodiment.

In another aspect, referring to FIG. 4, the steering control method according to the present embodiment may include analyzing, by an analyzer 510, states of different communication channels of a communication channel unit based on data transmitted and received through the communication channel unit (S710), determining, by a determiner 520, which communication channel among the different communication channels of the communication channel unit is most suitable for communication as a result of the analysis by the analyzer 510 (S720), selecting and using, by a selector 530, the most suitable communication channel among the different communication channels according to the determination result by the determiner 520 (S730), and outputting, by an output unit 540, an operating state for each of the different communication channels of the communication channel unit analyzed by the analyzer 510 (S740).

For example, in step of analyzing, the analyzer 510 may detect, if a state of the communication channel unit is abnormal, whether data is transmitted and received through a first internal communication channel, a second internal communication channel, and an external communication channel during a predetermined period based on data transmitted and received through the communication channel unit.

In addition, in step of determining, the determiner 520 may determine that the first internal communication channel has failed if data transmission/reception through the first internal communication channel is not detected.

In addition, in step of selecting, the selector 530 may select and use the second internal communication channel or the external communication channel as a communication in channel.

As another example, in step of analyzing, the analyzer 510 may detect, if a state of the communication channel unit is abnormal, whether data is transmitted and received through a first internal communication channel, a second internal communication channel, and an external communication channel during a predetermined period based on data transmitted and received through the communication channel unit.

In addition, in step of determining, the determiner 520 may determine that the second internal communication channel has failed if data transmission/reception through the second internal communication channel is not detected.

In addition, in step of selecting, the selector 530 may select and use the first internal communication channel or the external communication channel as a communication channel.

As another example, in step of analyzing, the analyzer 510 may detect, if a state of the communication channel unit is abnormal, whether data is transmitted and received through a first internal communication channel, a second internal communication channel, and an external communication channel during a predetermined period based on data transmitted and received through the communication channel unit.

In addition, in step of determining, the determiner 520 may determine that the external communication channel has failed if data transmission/reception through the external communication channel is not detected.

In addition, in step of selecting, the selector 530 may select and use the first internal communication channel or the second internal communication channel as a communication channel.

According to the steering control device and method of the present embodiments, it is possible to improve the reliability by determining and using the most suitable communication channel among the different communication channels of the communication channel unit based on the states of the communication channels of the communication channel unit connected to the plurality of control modules. In addition, even if a failure occurs in one communication channel, it is possible to increase stability by controlling data transmission and reception through one or more communication channels.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device comprising:
   a controller including a first control module and a second control module for controlling a steering motor; and
   a communication channel unit including a first internal communication channel connecting the first control module and the second control module to each other, a second internal communication channel connecting the first control module and the second control module to each other, and an external communication channel which connects the first control module and the second control module to each other and is connected to a vehicle,
   wherein the controller is configured to analyze a state of the communication channel unit based on data transmitted and received through the communication channel unit, determine a communication channel to use for communication among different communication channels, and select and use the determined communication channel,
   wherein, if a difference between data values transmitted and received through two communication channels among the first internal communication channel, the second internal communication and the external communication channel is included in a reference value range, the controller selects to use an average value of data values transmitted and received through the two communication channels.

2. The steering control device of claim 1, wherein the controller comprises:
an analyzer configured to analyze states of different communication channels of the communication channel unit based on data transmitted and received by the first control module and the second control module through the communication channel unit;
a determiner configured to determine a communication channel to use for communication among different communication channels of the communication channel unit as a result of an analysis by the analyzer; and
a selector configured to select and use the determined communication channel among communication channels according to a result of a determination by the determiner.

3. The steering control device of claim 2, wherein the controller further comprises an output unit configured to output an operating state for each different communication channel of the communication channel unit analyzed by the analyzer.

4. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the first internal communication channel has failed if data transmission/reception through the first internal communication channel is not detected, and
select and use the second internal communication channel or the external communication channel as a communication channel.

5. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the second internal communication channel has failed if data transmission/reception through the second internal communication channel is not detected, and
select and use the first internal communication channel or the external communication channel as a communication channel.

6. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the external communication channel has failed if data transmission/reception through the external communication channel is not detected, and
select and use the first internal communication channel or the second internal communication channel as a communication channel.

7. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the first internal communication channel and the second internal communication channel have failed if data transmission/reception through the first internal communication channel and the second internal communication channel are not detected, and
select and use the external communication channel as a communication channel.

8. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the first internal communication channel and the external communication channel have failed if data transmission/reception through the first internal communication channel and the external communication channel are not detected, and
select and use the second internal communication channel as a communication channel.

9. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the second internal communication channel and the external communication channel have failed if data transmission/reception through the second internal communication channel and the external communication channel are not detected, and
select and use the first internal communication channel as a communication channel.

10. The steering control device of claim 1, wherein the controller is configured to,
detect whether data is transmitted and received through the first internal communication channel, the second internal communication channel, and the external communication channel for a predetermined period based on the data transmitted and received through the communication channel unit,
determine that the first internal communication channel, the second internal communication channel and the external communication channel have failed if data transmission/reception through the first internal communication channel, the second internal communication channel and the external communication channel are not detected, and
output operating states for the first internal communication channel, the second internal communication channel, and the external communication channel as abnormal states.

11. The steering control device of claim 1, wherein the controller is configured to,
compare data transmitted and received through the first internal communication channel for a predetermined period based on data transmitted and received through the communication channel unit with data transmitted and received through the second internal communication channel or the external communication channel,
determine that the first internal communication channel has failed if data transmitted and received through the first internal communication channel is different from data transmitted and received through the second internal communication channel or the external communication channel, and
select and use the second internal communication channel and the external communication channel as a communication channel.

12. The steering control device of claim 1, wherein the controller is configured to,
compare data transmitted and received through the second internal communication channel for a predetermined period based on data transmitted and received through the communication channel unit with data transmitted and received through the first internal communication channel or the external communication channel,
determine that the second internal communication channel has failed if data transmitted and received through the second internal communication channel is different from data transmitted and received through the first internal communication channel or the external communication channel, and
select and use first internal communication channel and the external communication channel as a communication channel.

13. The steering control device of claim 1, wherein the controller is configured to,
compare data transmitted and received through the external communication channel for a predetermined period based on data transmitted and received through the communication channel unit with data transmitted and received through the first internal communication channel or the second internal communication channel,
determine that the external communication channel has failed if data transmitted and received through the external communication channel is different from data transmitted and received through the first internal communication channel or the second internal communication channel, and
select and use the first internal communication channel and the second internal communication channel as a communication channel.

14. The steering control device of claim 1, wherein the controller is configured to,
compare data transmitted and received through the first internal communication channel, the second internal communication channel, and the external communication channel for a predetermined period of time with each other based on the data transmitted and received through the communication channel unit,
determine that the first internal communication channel, the second communication channel and the external communication channel have failed if the data transmitted and received through the first internal communication channel, the second internal communication channel, and the external communication channel are different from each other, and
output operating states of the first internal communication channel, the second internal communication channel, and the external communication channel as abnormal states.

15. The steering control device of claim 1, wherein the communication channel unit further comprises a third internal communication channel connecting the first control module and a third control module to each other,
wherein the controller is configured to,
detect whether data is transmitted and received through the first internal communication channel, the second internal communication channel, the third internal communication channel, and the external communication channel during a predetermined period based on the data transmitted and received through the communication channel unit,
determine that the third internal communication channel has failed if data transmission/reception through the third internal communication channel is not detected, and
select and use the external communication channel as a communication channel.

16. The steering control device of claim 1, wherein the communication channel unit further comprises a fourth internal communication channel connecting the second control module and a fourth control module to each other,
wherein the controller is configured to,
detect whether data is transmitted and received through the first internal communication channel, the second internal communication channel, the fourth internal communication channel, and the external communication channel during a predetermined period based on the data transmitted and received through the communication channel unit,
determine that the fourth internal communication channel has failed if data transmission/reception through the fourth internal communication channel is not detected, and
select and use the external communication channel as a communication channel.

17. A steering control method comprising:
analyzing, by an analyzer, states of different communication channels of a communication channel unit based on data transmitted and received through the communication channel unit;
determining, by a determiner, a communication channel to use for communication among the different communication channels of the communication channel unit as a result of the analysis by the analyzer;
selecting and using, by a selector, the determined communication channel among the different communication channels according to the determination result by the determiner; and
outputting, by an output unit, an operating state for each of the different communication channels of the communication channel unit analyzed by the analyzer,
wherein, if a difference between data values transmitted and received through two communication channels among the different communication channels is included in a reference value range, the selector selects to use an average value of data values transmitted and received through the two communication channels.

18. The steering control method of claim 17, wherein the analyzing comprises detecting, if a state of the communication channel unit is abnormal, whether data is transmitted and received through a first internal communication channel, a second internal communication channel, and an external communication channel during a predetermined period based on data transmitted and received through the communication channel unit,
wherein the determining comprises determining that the first internal communication channel has failed if data transmission/reception through the first internal communication channel is not detected, and wherein the selecting comprises selecting and using the second internal communication channel or the external communication channel as a communication channel.

19. The steering control method of claim 17, wherein the analyzing comprises detecting, if a state of the communication channel unit is abnormal, whether data is transmitted and received through a first internal communication channel, a second internal communication channel, and an external communication channel during a predetermined period based on data transmitted and received through the communication channel unit, wherein the determining comprises determining that the second internal communication channel has failed if data transmission/reception through the second internal communication channel is not detected, and wherein the selecting comprises selecting and using the first internal communication channel or the external communication channel as a communication channel.

20. The steering control method of claim 17, wherein the analyzing comprises detecting, if a state of the communication channel unit is abnormal, whether data is transmitted and received through a first internal communication channel, a second internal communication channel, and an external communication channel during a predetermined period based on data transmitted and received through the communication channel unit, wherein the determining comprises determining that the external communication channel has failed if data transmission/reception through the external communication channel is not detected, and wherein the selecting comprises selecting and using the first internal communication channel or the second internal communication channel as a communication channel.

* * * * *